United States Patent [19]

Smith et al.

[11] Patent Number: 4,721,513
[45] Date of Patent: Jan. 26, 1988

[54] CATHODE PREPARATION METHOD FOR MOLTEN CARBONATE FUEL CELL

[75] Inventors: James L. Smith, Lemont; James W. Sim, Evergreen Park; Eugenia H. Kucera, Downers Grove, all of Ill.

[73] Assignee: The United States of America represented by the United States Department of Energy, Washington, D.C.

[21] Appl. No.: 343,606

[22] Filed: Jan. 28, 1982

[51] Int. Cl.$^4$ ............................................. H01M 6/00
[52] U.S. Cl. .................................. 29/623.5; 429/223; 429/45
[58] Field of Search ................. 29/623.5; 429/223, 40, 429/41, 42, 43, 44, 45

[56] References Cited

U.S. PATENT DOCUMENTS

| | | | |
|---|---|---|---|
| 4,115,632 | 9/1978 | Kinoshita et al. | 429/46 |
| 4,251,600 | 2/1981 | Sim et al. | 429/46 |
| 4,308,299 | 12/1981 | Arendt | 429/223 |
| 4,410,607 | 10/1983 | Arons et al. | 429/40 |

OTHER PUBLICATIONS

Development of Molten Carbonate Fuel Cell Power Plant, DOE/ET/17019-2, Quarterly Tech. Progress Report, May 1–Jul. 31, 1980; pp. 75–78.
Development of Molten Carbonate Fuel Cell Power Plant Tech., DOE/ET/15440-2, Quarterly Technical Progress Report, No. 2, Jan. 1–Mar. 30, 1980, pp. 2–18 & 2–19.
Fuel Cell Research of Second Generation Molten-Carbonate Systems, San-11276-4, Final Report, Oct. 1, '78–Jan. 31, 1980; pp. 1–59 & 1–61.
Development & Testing of Alternative Fuel Cell Components, UAC-47344, Paper for Presentation at National Fuel Cell Seminar, 6/23-26, 1981.

*Primary Examiner*—P. W. Echols
*Attorney, Agent, or Firm*—Hugh W. Glenn; Robert J. Fisher; Judson R. Hightower

[57] ABSTRACT

A method of preparing a porous cathode structure for use in a molten carbonate fuel cell begins by providing a porous integral plaque of sintered nickel oxide particles. The nickel oxide plaque can be obtained by oxidizing a sintered plaque of nickel metal or by compacting and sintering finely divided nickel oxide particles to the desired pore structure. The porous sintered nickel oxide plaque is contacted with a lithium salt for a sufficient time to lithiate the nickel oxide structure and thus enhance its electronic conductivity. The lithiation can be carried out either within an operating fuel cell or prior to assembling the plaque as a cathode within the fuel cell.

10 Claims, No Drawings

CATHODE PREPARATION METHOD FOR MOLTEN CARBONATE FUEL CELL

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

The present invention relates to methods of preparing porous plaques for use as electrodes in a variety of applications. One principal use is for the porous cathode within a molten carbonate fuel cell. A plaque of the type described herein may also have application as an electrode within an apparatus for recovering tritium produced in the neutron bombardment of lithium compounds.

Molten carbonate fuel cells typically operate at high temperatures of about 900°–1000° K. to convert chemical energy to D.C. electricity. Fuels such as $H_2$, CO or methanol react with oxidant gases, for instance, air or oxygen including carbon dioxide during this production of electrical energy. Typical reactions are as follows:

at the anode: $H_2 + CO_3^= \longrightarrow CO_2 + H_2O + 2e^-$ $CO + CO_3^= \longrightarrow 2CO_2 + 2e^-$ at the cathode: $2e^- + CO_2 + \tfrac{1}{2}O_2 \longrightarrow CO_3^=$ It is contemplated that these fuel cells will typically operate in stacks of repeating elements. Each element contains an anode, a cathode and an electrolyte structure separating the two electrodes. In the molten carbonate cell, anode structures typically include porous sintered nickel alloyed with chromium or cobalt for strength. The electrolyte structure can be a porous tile of lithium aluminate filled with a molten carbonate electrolyte. The electrolyte tile should include an appropriate pore structure to permit wetting without flooding of the adjacent electrode. Typical electrolyte tiles and molten carbonate salt electrolytes are presented in U.S. Pat. No. 4,115,632 to Kinoshita et al and in U.S. Pat. No. 4,251,600 to Sim et al.

Early efforts in providing cathodes for molten carbonate fuel cells have involved assembling the cell with a porous nickel plaque as a cathode. On raising the cell to operating temperature and exposing the plaque to oxygen and molten carbonate the nickel cathode plate oxidizes in situ to NiO and incorporates a small percentage e.g. 2–3 atom percent lithium. Nickel oxide (NiO) is a deficient semiconductor (P-type) that exhibits rather poor electrical conductivity. Lithiation, that is the incorporation of lithium within the nickel oxide lattice has been found to provide an enormous enhancement in the P-type conductivity. However, substantial difficulties have arisen in the preparation of nickel oxide cathodes with in situ oxidation and lithiation of the sintered nickel plaque. For example, substantial cathode swelling with accompanying lithium loss from the electrolyte has made it desirable to provide alternate approaches to the preparation of porous cathodes for the molten carbonate fuel cells.

Previous attempts to fabricate sintered nickel oxide plaques for use as cathodes have involved forming sinters of lithiated nickel oxide. Due to the volatility of lithium oxide, only a narrow range of sintering conditions has been found to be appropriate for both retention of lithium within the porous structure and for providing sufficient sintering to impart good mechanical strength and integrity to the cathode structure. Where temperatures much above 1100°–1200° C. are employed, the lithium is driven from the NiO lattice within a short time. Temperatures below about 1000° C. have failed to produce sintered structures of sufficient physical integrity for use within fuel cells.

Efforts to lithiate NiO plaques previously have not been successful due to the procedures adopted. Often the use of elevated temperatures or extended exposures have volatalized lithium from the NiO lattice.

SUMMARY OF THE INVENTION

Therefore in view of the above, it is an object of the present invention to provide a method of producing a porous plaque of sintered nickel oxide for use as a cathode in a fuel cell employing molten carbonate electrolyte.

It is a further object to provide a method of preparing porous nickel oxide cathode structures in which nickel is oxidized prior to assembling the structure within a molten carbonate fuel cell.

It is a further object to provide such a method in which sintering conditions ca be selected for strength and porosity without regard to retention of lithium within a nickel oxide porous structure.

In accordance with the present invention, a method of preparing a cathode structure for use in a fuel cell containing molten carbonate electrolyte involves providing a porous plaque of sintered nickel oxide that is substantially free of lithium and subsequently exposing the plaque to molten lithium salt for a time and at a temperature sufficient to lithiate the nickel oxide to a lithium content of about 1–6 atom percent lithium during which the structural integrity of the porous plaque is maintained.

In a more specific aspect of the invention, the porous plaque of nickel oxide is formed by compacting nickel oxide particles into the desired shape and sintering the compact at a temperature of at least 1000° C. for at least 1 hour.

In one other more specific aspect of the invention, the porous nickel oxide plaque is provided by oxidizing a porous plaque of nickel in an oxygen containing gas at a temperature less than 1000° C.

In yet another specific aspect of the invention, a porous nickel oxide plaque is lithiated by contacting it with a molten electrolyte including lithium carbonate while assembled as an electrode in a fuel cell operated at about 600°–700° C. The electro-lyte is held within a porous ceramic tile such that the porous nickel oxide plaque is contacted with only sufficient electrolyte to wet without flooding its internal pore volume.

In an alternate aspect of the invention the nickel oxide plaque is lithiated prior to assembly as an electrode of a fuel cell by contacting it with sufficient lithium salt and heat treating it at a temperature of about 600°–700° C. for at least one hour to achieve infusion of lithium. In one procedure the plaque is flooded with an aqueous solution of lithium hydroxide, dried and heat treated at about 600°–700° C. In another procedure a molten salt containing a sufficient amount of lithium carbonate is added to the plaque which is then heat treated to infuse lithium into the nickel oxide lattice.

The invention also contemplates a method of preparing a porous cathode structure for use within a fuel cell employing molten carbonate electrolyte and gaseous reactants. The method includes providing finely divided nickel oxide powder, compacting the powder to form a cohesive nickel oxide layer, sintering the layer at a sufficient temperature and time to provide an integral porous nickel oxide plaque and contacting the plaque with a limited amount of lithium salt substantially free of halides to lithiate the nickel oxide lattice to about 1-6 atom percent lithium.

In a more specific aspect of this method, the finely divided nickel oxide particles are provided with a size distribution of about 0.5 to 1.0 micrometers.

DETAILED DESCRIPTION OF THE PREFERRED EMBODIMENT

The method of the present invention is carried out by providing a sintered integral structure of nickel oxide and subsequently lithiating the nickel oxide lattice to a sufficient level e.g. about 1-6 atom percent to substantially improve its electronic conductivity and enhance its suitability for use as the cathode within a molten carbonate fuel cell. The porous nickel oxide plaque can be provided by oxidizing a presintered nickel plaque of suitable porosity or by forming a plaque of the desired pore structure from nickel oxide particles. An important aspect of the method is that the nickel oxide plaque is provided substantially free of lithium. Although trace amounts of lithium, e.g. less than 0.2 atom percent may be present, no lithium is added prior to forming the porous nickel oxide plaque which is subsequently lithiated with lithium salt to provide sufficient electronic conductivity to the NiO lattice.

A porous plaque of sintered nickel metal can be provided by known metallurgical techniques. Pore formers may be included in the sintering step to provide a pore structure in the 2-25 micrometers range for subsequent passage of reactant gases in the electrode. A finer pore structure of less than 1 micrometer is also desirable for enhanced wetting and retention of the molten carbonate electrolyte. Such an integral nickel sinter can be oxidized by exposure to air at a temperature less than a 1000° C., preferably about 600°-700° C. for a sufficient period until the oxidation is complete. For example, heating in air for about 5 hours can be sufficient but as long as 24 hours may be required in instances where the plaque is well covered and supported by ceramic plates. More severe oxidizing conditions can reduce the surface area of the porous plaque and interfere with retention of the electrolyte or admission of reactant gas into the electrode.

In providing a porous nickel oxide structure by the sintering of nickel oxide particles, no lithium need be present. Particles of suitable size, typically, between 0.5 and 1.0 micrometers are compacted into the desired shape and sintered at a temperature in excess of 1000° C. for a sufficient time to form an integral structure of the desired porosity. Preferably, a temperature of about 1100°-1400° C. is employed in this sintering step. It is of particular note that temperatures of 1200°-1400° C. can be used to sinter the substantially lithium-free plaque.

In one method of forming the nickel oxide plaque, finely divided nickel oxide particles are heat treated at about 1000° C. to form elongated, rod-shaped agglomerates. The agglomerates subsequently are sintered at a temperature of about 1100°-1400° C. to form the electrode structure.

The resulting pore structure should include about 30-50% of its pore volume below 1 micrometer in pore diameter to facilitate electrolyte wetting and retention while at least 25% of its pore volume should be in excess of 5 micrometers in pore diameter to permit passage of reactant gases. This pore structure is desirable regardless of the manner of providing the porous nickel oxide plaque. One manner of forming a porous nickel oxide plaque from finely divided nickel oxide particles at reduced temperature to retain lithium is disclosed in the assignees' co-pending application to Arons et al entitled POROUS ELECTRODE PREPARATION METHOD, now U.S. Pat. No. 4,410,607 issued Oct. 18, 1983.

The porous sinter of nickel oxide is lithiated to about 1-6 atomic percent lithium in respect to nickel oxide to enhance the electronic conductivity of the resulting cathode structure. Preferably, about 2-3 atomic percent lithium is used in the fuel cell cathode.

Molten carbonate fuel cells employ lithium carbonate often in mixture with other carbonates as electrolyte. Consequently, lithium carbonate may be conveniently selected as an agent for lithiating the porous nickel oxide plaque. Chlorides are to be avoided as they are regarded as contaminants in molten carbonate fuel cells. It is preferred that only a limited amount of lithium be used in the lithiation step to avoid completely flooding the pore volume of the plaque with molten salt prior to its use. A completely flooded pore volume will not permit flow of reactant gases in the fuel cell. On solidification and remelting of electrolyte in a completely flooded plaque, the contraction and expansion of the salt may damage the plaque pore structure.

One manner of performing this limited lithiation is to assemble the nickel oxide plaque into a fuel cell containing molten salt including lithium carbonate within a porous tile adapted for its retention. A suitable fuel cell tile will have a sufficient portion of its structure of small pore size to retain most of the electrolyte while permitting release of only small quantities that will not completely flood the nickel oxide structure employed as a cathode. Where the lithiation is done outside the fuel cell, a limited amount of molten lithium carbonate can be employed and permitted to drain or seep into the pore volume of small pore size without flooding the large pores intended for reactant gas passage.

In one other manner of lithiating the nickel oxide structure an aqueous solution of lithium hydroxide is prepared and applied to the sintered nickel oxide plaque followed by evaporating to dryness. Only sufficient lithium is added into the plaque to lithiate the nickel oxide structure on heat treating to about 1-6 atom percent.

The following examples are presented to illustrate the method of the present invention.

EXAMPLE I

A porous plaque of sintered nickel metal obtained from a commercial source exhibited about 60% porosity. The plaque was heated in air to about 650° C. for about 24 hours with ceramic plate supports to oxidize the exposed pore surfaces. The oxidized nickel plaque was then assembled as the cathode within a fuel cell having $Li_2CO_3$—$K_2CO_3$ electrolyte retained within a hot-pressed lithium aluminate-alkali metal carbonate tile. A chromium doped porous nickel plaque was used as an anode. The fuel cell was operated for 500 hours with oxygen and carbon dioxide gas at the cathode and hydrogen gas at the anode. An examination of the cathode after disassembling the cell showed the plaque structure was substantially retained with open interconnected gas passages. The structure was made up of rod-shaped agglomerates of about $5 \times 20$ $\mu$m formed of about 1 $\mu$m particles.

EXAMPLE II

A similar porous plaque was prepared for electrical conductivity testing. This plaque was wet with a solution of about 15 g. LiO H.H$_2$O in 100 ml H$_2$O. It was then dried and heat treated in air at 650° C. for about 4 hours. Conductivity was measured to be 0.5 $(\Omega cm)^{-1}$ at room temperature. This corresponded to about 5.2 atom percent lithium. As is well documented, the conductivity of lithiated nickel oxide increases by two orders of magnitude between room temperature and 650° C., thus this cathode sample would have a conductivity of about 50 $(\Omega cm)^{-1}$ at fuel cell operating temperature.

EXAMPLE III

Finely divided nickel oxide particles of about 0.5 to 1.0 micrometers particle size are mixed with a polyvinyl alcohol in water solution and allowed to set into a solid mass. The mass is comminuted into agglomerate particles of about 30-60 micrometers which are compacted into a porous layer of the desired cathode shape. The compact is sintered at about 1200° C. for about 1 hour to provide a porous sintered nickel oxide structure having a bimodal porosity. The plaque is assembled as a cathode within a fuel cell similar to that of Example I to achieve lithiation of the NiO structure.

From the above it is seen that the present invention provides a method of providing porous sintered nickel oxide cathodes for use in molten carbonate fuel cells. Through use of this method, the cathodes can be prepared without regard to loss of lithium during sintering steps. Furthermore, unlike previous fuel cell cathodes of this type, excessive swelling of the cathode on oxidation and lithiation within the fuel cell is avoided. The method also provides for the use of less expensive nickel oxide particles rather than nickel as raw material in the cathode preparation.

Although the present invention has been described in terms of specific materials, procedures and process conditions, it will be clear to one skilled in the art that various changes may be made in the selected conditions within the scope of the attached claims.

The embodiments of this invention in which an exclusive property or privilege is claimed are defined as follows:

1. A method of preparing a cathode structure for use in a fuel cell with a molten carbonate salt electrolyte comprising:
   providing a porous sintered plaque of nickel metal that is substantially free of lithium;
   oxidizing the nickel metal in said porous plaque substantially free of lithium to form nickel oxide by contact with an oxygen containing gas at a temperature of no more than about 600° C. to 700° C.; and
   subsequently adding to said plaque a limited amount of lithium salt at a temperature of no more than 600°-700° C. to lithiate said nickel oxide to a lithium level of about 1-6 atom percent lithium while maintaining the structure integrity of said plaque.

2. The method of claim 1 wherein said lithium salt added is substantially free of chlorides.

3. The method of claim 1 wherein said lithium salt includes Li$_2$CO$_3$ added in molten form to said plaque only in sufficient amount to wet internal pore surfaces but without flooding the pore volume of said plaque.

4. The method of claim 3 wherein said plaque after said oxidizing step is assembled as the cathode in a fuel cell having an electrolyte including Li$_2$CO$_3$ and heated to a temperature at which the electrolyte is molten to lithiate said nickel plaque.

5. The method of claim 4 wherein said molten electrolyte is held within a porous ceramic tile between the cathode and anode of the fuel cell at a temperature of about 600°-700° C. such that said porous oxide plaque is contacted with only sufficient molten electrolyte to wet internal pore surfaces without flooding the internal pore volume of the porous plaque.

6. A method of preparing a porous cathode structure for use within a fuel cell employing a molten carbonate salt electrolyte and gaseous reactants comprising:
   providing finely divided nickel oxide powder;
   compacting said powder to form a thin, cohesive nickel oxide layer;
   sintering said layer at a sufficient temperature and time to provide an integral porous plaque that is substantially free of lithium; and
   contacting said plaque at a temperature of no more than 600°-700° C. with a limited amount of lithium salt substantially free of halides without flooding the porous volume of said plaque to wet internal pore surfaces and lithiate the nickel oxide.

7. The method of claim 6 wherein said plaque is contacted with an aqueous solution of lithium hydroxide in an amount only sufficient to lithiate said nickel oxide to about 1-6 atom percent lithium.

8. The method of claim 6 wherein said porous plaque after said sintering step is assembled as a cathode structure within a fuel cell containing lithium carbonate and at least one other alkali metal carbonate as an electrolyte and said fuel cell is heated to a temperature at which the carbonates become molten to contact and lithiate the nickel oxide in said cathode.

9. method of preparing a porous cathode structure for use within a fuel cell employing a molten carbonate salt electrolyte and gaseous reactants comprising:
   providing finely divided nickel oxide powder;
   comacting said powder to form a thin, cohesive nickel oxide layer;
   sintering said layer at a temperature of 1100°-1400° C. for a sufficient time to provide an integral porous plaque that is substantially free of lithium; and
   subsequently contacting said plaque with a limited amount of lithium salt substantially free of halides without flooding the porous volume of said plaque to wet internal pore surfces and lithiate the nickel oxide at a temperature of 600°-700° C.

10. The method of claim 9 wherein said porous plaque is sintered at a temperature of 1200°-1400° C.

* * * * *